(12) United States Patent
Mantysalo

(10) Patent No.: US 8,018,834 B2
(45) Date of Patent: Sep. 13, 2011

(54) METHODS AND DEVICES FOR WIRE-BASED CONFIGURATION OF WIRELESS DEVICES

(75) Inventor: Tapio Mantysalo, Hevonpaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/305,745

(22) PCT Filed: Jun. 28, 2006

(86) PCT No.: PCT/IB2006/001235
§ 371 (c)(1),
(2), (4) Date: Feb. 5, 2010

(87) PCT Pub. No.: WO2008/001146
PCT Pub. Date: Jan. 3, 2008

(65) Prior Publication Data
US 2010/0128632 A1 May 27, 2010

(51) Int. Cl.
*H04B 7/00* (2006.01)
(52) U.S. Cl. ...................................................... 370/210
(58) Field of Classification Search .................. 370/310, 370/311–313, 328–339, 464; 455/422.1–426.1, 455/41.2, 550.1
See application file for complete search history.

(56) References Cited

U.S. PATENT DOCUMENTS

| 7,802,047 B2* | 9/2010 | Chung et al. ................... 710/313 |
| 2003/0148797 A1 | 8/2003 | Huang |
| 2005/0044372 A1 | 2/2005 | Aull et al. |
| 2006/0025074 A1* | 2/2006 | Liang et al. ................... 455/41.2 |
| 2006/0062400 A1* | 3/2006 | Chia-Chun ...................... 381/74 |
| 2006/0149858 A1 | 7/2006 | Bhesania et al. |
| 2009/0167487 A1* | 7/2009 | Shah et al. ...................... 340/5.2 |
| 2010/0042781 A1* | 2/2010 | Reuss ............................ 711/115 |

FOREIGN PATENT DOCUMENTS

| EP | 1221653 | 7/2002 |
| EP | 1677189 | 7/2006 |
| WO | WO 2005/078555 | 8/2005 |
| WO | WO2006135872 | 12/2006 |

* cited by examiner

*Primary Examiner* — Frank Duong
(74) *Attorney, Agent, or Firm* — Hollingsworth & Funk, LLC

(57) ABSTRACT

The invention relates to a method for configuring a wireless interface of a first electronic device, comprising establishing a wired connection with a second electronic device having a wireless interface; negotiating, via said connection, a configuration for said wireless interface with said second electronic device, said configuration enabling a wireless connection between said first and said second electronic device; and configuring said wireless interface of said first electronic device according to said configuration.

16 Claims, 4 Drawing Sheets

METHODS AND DEVICES FOR WIRE-BASED CONFIGURATION OF WIRELESS DEVICES

The present invention relates to the configuration of wireless devices using a wired connection. It particularly relates to setting up wireless interfaces of mobile electronic devices using a wired Universal Serial Bus (USB) connection.

PRIOR ART

Devices using wireless interfaces such as Bluetooth or WLAN have become very popular recently. For example Bluetooth-based headsets for mobile phones provide many advantages for the user, particularly with respect to the more flexible handling. However, setting up the wireless connections between two or more devices can be difficult for un-experienced users.

For example in WLAN connections settings such as IP address, WEP/WPA keys, gateway, DNS server address etc. have to be known to the user and be correctly configured, in order to establish the WLAN connection. Coupling Bluetooth-based devices, that is, performing the pairing process of Bluetooth, will usually at least require to enter an identical PIN on both devices. In case of devices like headsets which only comprise a very basic set of controls (e.g. volume plus on/off key), usually the Bluetooth PIN is programmed fixedly into the device. Here the user has to know this fixed PIN in order to establish the connection, which will most certainly require reading the manual of the device.

Furthermore, wireless mobile devices like headsets are battery-powered. In case the battery is empty the user is required to recharge it before he can use the device again. That is, he usually has to connect a wall-plug charger to this headset by wire, or put the headset in a kind of "docking station" arrangement. Thus he is not able to use the headset, at least not in a mobile fashion.

For wired connection between electronic devices, particularly peripheral devices and e.g. computers or mobile phones, the Universal Serial Bus (USB) connection has become a widely accepted standard. USB enables a very sophisticated plug-and-play procedure, that is, most USB devices are or may be automatically detected and suitably configured upon being connected to another device.

The USB interface also allows providing power to connected devices. It is capable of providing 100 mA up to 500 mA per port. Therefore the USB bus can also be used to charge mobile devices like mp3 players and the like, through the USB connection used also for transferring data to the device.

Standard USB uses a client/server architecture, that is, one USB device acts as a USB host (e.g. a PC) and the other acts as USB peripheral (e.g. a USB headset). Only the USB host contains the device driver and the necessary controls to transfer the data. The USB peripherals do not comprise those parts, so two USB peripheral devices (like digital camera and printer) cannot exchange data without the use of USB hosts.

USB On-The-Go (USB OTG) is a supplement to the USB 2.0 specification, and was designed to overcome the above mentioned problem. With USB On-The-Go USB devices are provided with a limited ability to transfer data between themselves, without an intermediary USB host device. Two USB On-The-Go devices will automatically negotiate such that one will act as host and the other will act as peripheral.

Therefore it is an object of the present invention to provide methods and devices for facilitating the setup of wireless interfaces of electronic devices. It is a further object of the invention to provide means for enabling the use of battery powered wireless electronic devices while the battery is being charged.

SUMMARY OF THE INVENTION

According to an aspect of the present invention a method for configuring a wireless interface of a first electronic device is provided. The method comprises establishing a wired Universal Serial Bus (USB) connection with a second electronic device having a wireless interface;

negotiating, via said USB connection, a configuration for said wireless interface with said second electronic device, said configuration enabling a wireless connection between said first and said second electronic device; and configuring said wireless interface of said first electronic device according to said configuration.

The inventive method allows for an easy and simple configuration of wireless interfaces of electronic devices for wireless connections without user interaction. With respect to encrypted or otherwise secured wireless connections the invention also improves the security thereof, as keys and other secret information required for the connection may be exchanged by wire. Eavesdropping on unsecured wireless links can so be prevented.

According to an exemplary embodiment the negotiation comprises receiving said configuration. In other words, this embodiment allows "pushing" the configuration to the first device. This will usually apply to cases wherein there is a "master" or host device having a fixed network setting. A suitable configuration can then by "pushed" to the client or first device, that is, the configuration is received in a kind of passive mode.

According to an exemplary embodiment the negotiating comprises exchanging information with said second electronic device and determining said configuration based on said information. This relates to e.g. Bluetooth pairing procedures, wherein information needs to be exchanges in both directions. It may also relate to situations wherein the second device adapts its own wireless interface configuration to the configuration of the first device. In other words, this embodiment is useful in situations where both devices are of equal priority, or wherein a mutual setup/authentication is required.

A conventional manual pairing can additionally be provided in methods and devices of the present invention.

According to an exemplary embodiment the first electronic device comprises a rechargeable power supply, the method further comprising:

receiving power from said second electronic device via said USB connection for operating said first electronic device and charging said rechargeable power supply.

This embodiment allows using the first device, e.g. a wireless headset, even when the battery is discharged. Through the USB connection the battery can then also be recharged.

According to an exemplary embodiment the method further comprises routing data traffic between said first and said second electronic device through said USB connection; and responsive to disconnection of said USB connection establishing a wireless connection with said second electronic device according to said configuration, if no wireless connection exists; and routing said data traffic between said first and said second electronic device through said established or an existing wireless connection.

This embodiment allows to route data traffic, e.g. the audio data traffic between a mobile phone (second device) and a wireless headset (first device) through the cable USB connection. This allows shutting down the wireless transceiver as long as the USB connection exists. As will be explained later on, this can be advantageous in situations where wireless devices are not allowed, or where electromagnetic interference degrades the quality of the wireless link. In case the USB connection gets disconnected, e.g. when the battery of the first device has been recharged, a wireless link can be established using the negotiated configuration, and data traffic can then be routed through this wireless link.

According to an exemplary embodiment the negotiating comprises
sending said configuration,
and/or
exchanging information with said first electronic device and determining said configuration based on said information.

According to an exemplary embodiment the first electronic device comprises a rechargeable power supply, the method further comprising: providing power to said first electronic device via said USB connection, for operating said first electronic device.

In another embodiment having a first electronic device comprising a rechargeable power supply there is provided receiving power from said second electronic device via said USB connection for charging said rechargeable power supply.

In a further embodiment, the power supply of said second electronic device may be a battery. It may especially be a rechargeable battery. There may be implemented a mechanism that avoids draining the battery of said second electronic device too much in order to charge said rechargeable power supply of said first electronic device.

According to an exemplary embodiment the method further comprises
   routing data traffic between said first and said second electronic device through said USB connection; and
responsive to disconnection of said USB connection
   establishing a wireless connection with said first electronic device according to said configuration, if no wireless connection exists; and
   routing said data traffic between said first and said second electronic device through said established or an existing wireless connection.

According to another aspect of the present invention a computer program product is provided, comprising program code means stored on a computer readable medium for carrying out the method described above when said program product is run on a computer or network device.

According to a third aspect of the present invention an electronic device is provided, comprising
   a wireless interface;
   a USB interface; and
   a controller;
wherein said controller is adapted for
   establishing a wired USB connection with a second electronic device having a wireless interface;
   negotiating, via said USB connection, a configuration for said wireless interface with said second electronic device; and
   configuring said wireless interface according to said configuration.

According to an exemplary embodiment the negotiating comprises receiving said configuration, or
comprises exchanging information with said second electronic device and determining said configuration based on said information.

According to an exemplary embodiment the wireless interface is selected from the group comprising:
   a Bluetooth transceiver; and
   a WLAN transceiver.

The invention can also be applied to any other type of wireless interface.

According to an exemplary embodiment the electronic device further comprises
   a rechargeable power supply connected with said USB interface;
wherein said USB interface is adapted for receiving power from said second electronic device.

In another embodiment an electronic device is provided comprising a rechargeable power supply connected with said USB interface, wherein said power supply connected with said USB interface is fed by a battery which is preferably rechargeable.

According to an exemplary embodiment the controller is adapted for
   routing data traffic between said electronic device and said second electronic device through said USB connection; and
responsive to disconnection of said USB connection
   establishing a wireless connection with said second electronic device according to said configuration, if no wireless connection exists; and
   routing said data traffic between said electronic device and said second electronic device through said established or an existing wireless connection.

According to a fourth aspect of the present invention an electronic device is provided, comprising
   a wireless interface;
   a USB interface; and
   a controller;
wherein said controller is adapted for
   establishing a wired USB connection with a first electronic device having a wireless interface;
   negotiating, via said USB connection, a configuration for said wireless interface of said first electronic device with said first electronic device.

According to an exemplary embodiment the controller is adapted for
   configuring said wireless interface of said electronic device according to said configuration.

According to an exemplary embodiment the negotiating comprises
sending said configuration,
or
exchanging information with said first electronic device and determining said configuration based on said information.

According to an exemplary embodiment the wireless interface is selected from the group comprising:
   a Bluetooth transceiver; and
   a WLAN transceiver.

According to an exemplary embodiment the first electronic device comprises a rechargeable power supply, the electronic device further comprising:
   a power supply connected with said USB interface;
wherein said USB interface is adapted for providing power from said power supply to said first electronic device for operating said first electronic device and charging said rechargeable power supply.

According to an exemplary embodiment the controller is adapted for routing data traffic between said electronic device and said first electronic device through said USB connection; and responsive to a disconnection of said USB connection establishing a wireless connection with said first electronic device according to said configuration, if no wireless connection exists; and routing said data traffic between said electronic device and said first electronic device through said established or an existing wireless connection.

According to another embodiment successful configuration of the wireless link is indicated in the user interface of at least one of the two devices. Such indication can be made by an optical or acoustical signal.

BRIEF DESCRIPTION OF THE DRAWINGS

The accompanying drawings are provided for illustrating preferred embodiments of the present invention by way of example. They are only illustrative and not intended to restrict the scope of the present invention to the specific embodiments described therein. In the drawings

DETAILED DESCRIPTION OF THE INVENTION

It should be noted that the following detailed description of exemplary embodiments of the present invention will mainly be focused on the situation with a mobile phone and a wireless headset. However, the present invention can as well be used in conjunction with other combinations of wireless devices, mobile or not, provided they can be connected by a wire-based USB connection. Thus the present invention is not to be restricted to the specific embodiments described in the following.

Figure 1:
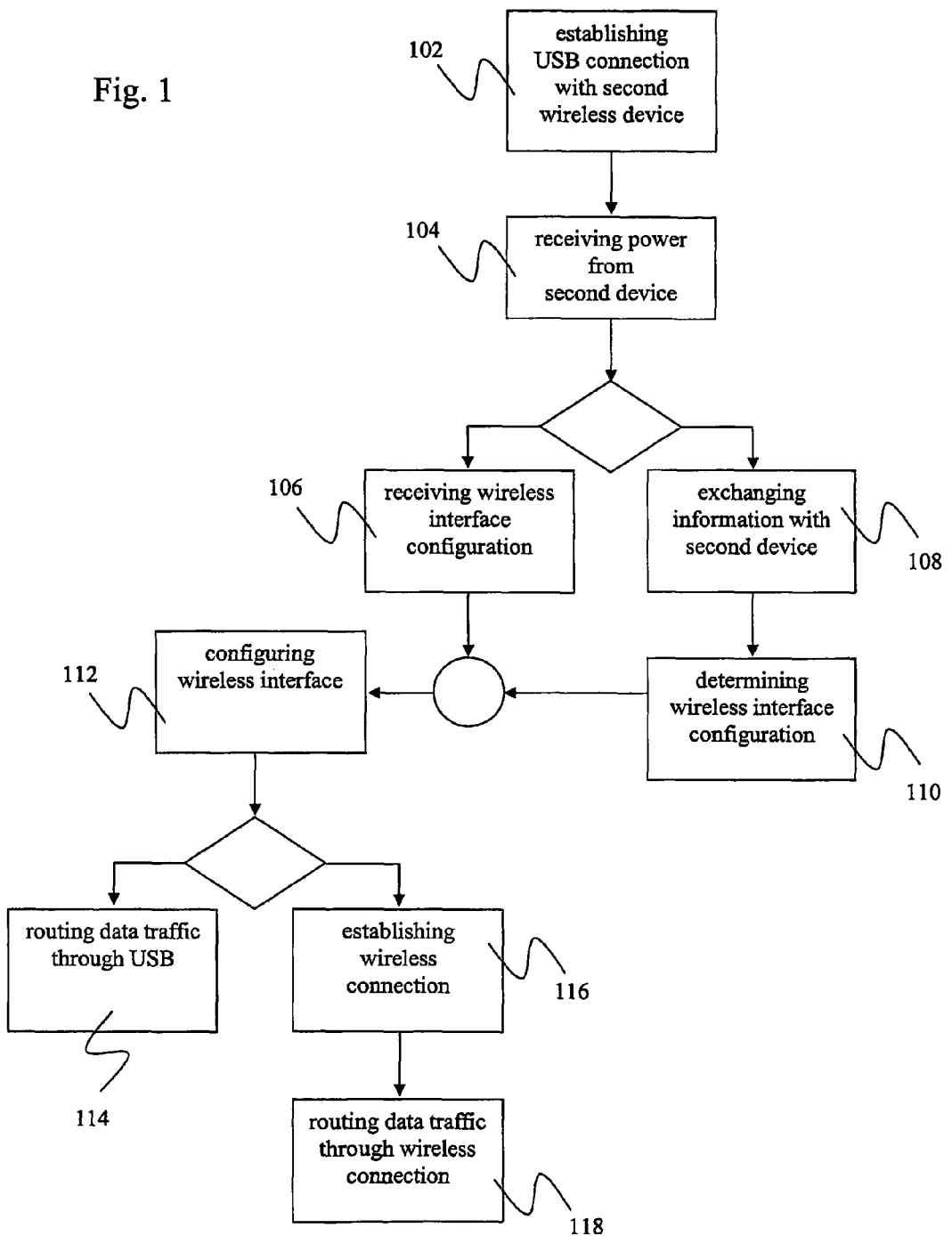
FIG. 1 is a flow diagram of an embodiment of the method of the present invention.

In FIG. 1 a flow diagram is depicted, showing steps of an exemplary embodiment of the inventive method, as implemented on the client end, that is, as performed at a first wireless device. In step 102 a USB connection with a second wireless device is established. "Establishing" in the context of the present invention refers both to the provision of the hardware connection, in other words, connecting two devices via a USB cable, as well as the logical link establishment. The latter particularly refers to the identification of the first wireless device at the second wireless device via USB, or vice versa. In a preferred embodiment the USB connection is made using the USB-on-the-go scheme.

In step 104 the first device receives electrical power from the second device, via the USB connection. This power is used for operating the first device, and/or for recharging a rechargeable power supply thereof. It is to be noted that this step is optional. This enables a wireless headset or similar device to be used even if its battery is completely discharged or when no batteries are inserted.

The next step is to negotiate a configuration for the wireless interface of the first device. In this figure two alternatives are depicted. According to the first alternative the wireless interface configuration is received from the second device in step 106, via the USB connection. This case applies for example to WLAN interfaces, wherein usually the client device (here the first device) just needs to know the correct settings, like IP address, gateway address, DNS server address, SSID etc. In other words, the client device is provided with a suitable configuration, whereas the configuration of the server device (here the second device) usually remains fixed.

According to the second alternative the two devices will exchange information in step 108, enabling them to derive or select a wireless interface configuration. This alternative applies to the case of a Bluetooth pairing procedure, wherein the two devices need to exchange information related to the pairing process, in order to be able to finally authenticate one another. In the context this authentication is also referred to as "configuration", as it allows the two devices to connect with each other. However, this may also relate to any other arrangement, where it is required or advantageous not to "push" the configuration to the first device, but to agree on shared parameters for the wireless settings. In any case, in this alternative path in step 110 a wireless configuration is determined.

Following both alternatives, in step 112, the wireless interface of the first device is configured according to the wireless configuration obtained in one of the two alternative paths.

Again there are two alternatives here. As there are many advantages connected with a wired connection when it is present, all data traffic between the two devices can be routed through the USB connection (step 114). In the exemplary case of a wireless headset as first device, and a mobile phone as second device, the audio data traffic would be routed through the USB link. However, this step is optional.

Another possibility is to establish a wireless connection using the obtained configuration, in step 116, and routing all data traffic, e.g. audio data, through this wireless connection in step 118. Step 116 and 118 may also be performed after a USB connection has been established according to step 114, in case the USB connection gets disconnected, for example because the headsets battery has been fully charged. This allows for an uninterrupted operation of e.g. the headset, that is, without audio dropouts. When both a wired USB as well as a wireless (e.g. Bluetooth or WLAN) connection is established, data traffic can be routed through either data path. Using the USB in this case would however enable to shut down the wireless transceiver to reduce power consumption/accelerate recharging.

Figure 2:
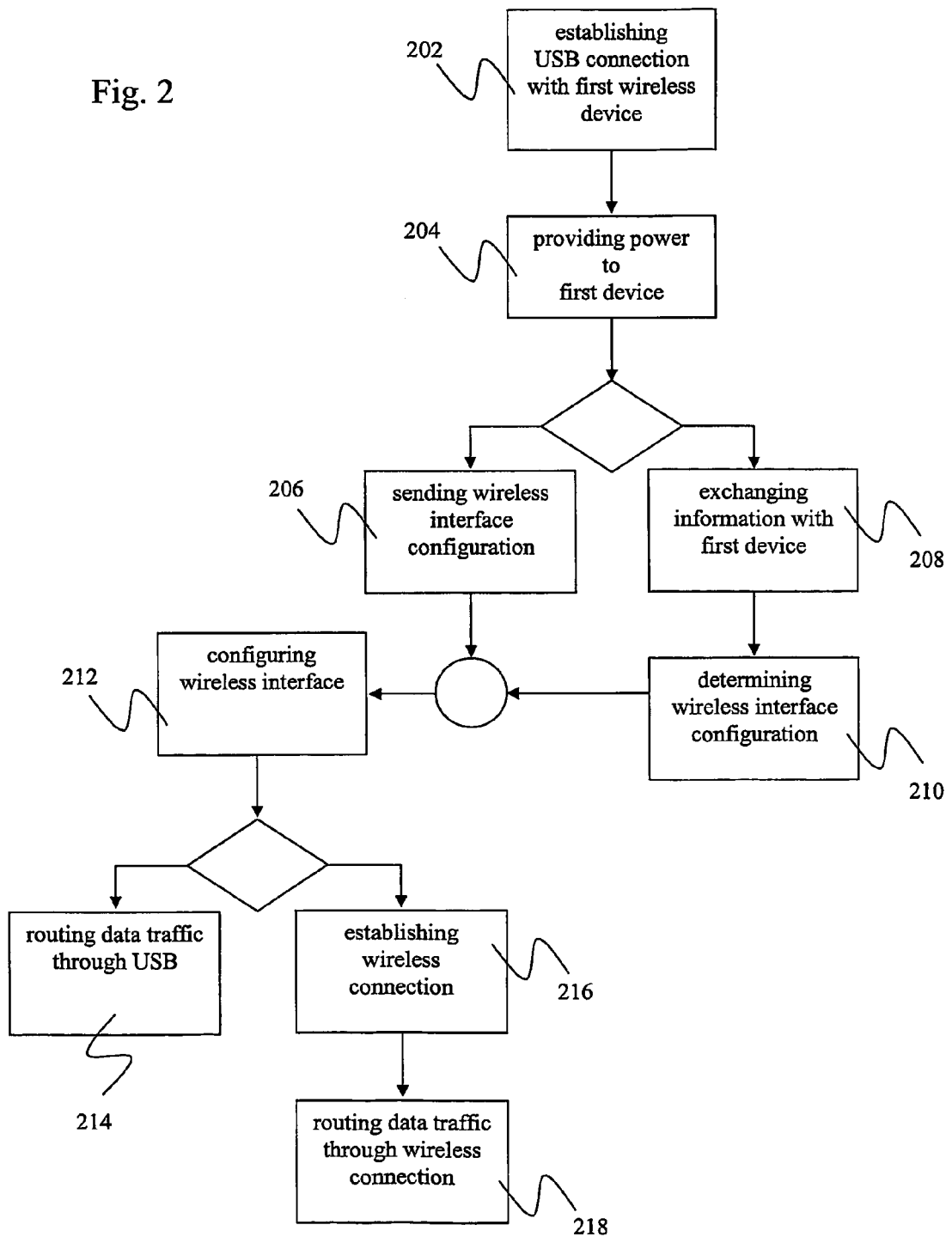
FIG. 2 is a flow diagram of another embodiment of the method of the present invention.

FIG. 2 is a flow diagram, showing steps of an exemplary embodiment of the inventive method, as implemented on the server end, that is, as performed at a second wireless device. Step 202 is similar to step 102 of FIG. 1.

In step 204 power is provided to the first wireless device. Again, this step is optional. Also, the power may be provided from any suitable power supply of the second device. That is, an internal switching power supply of a Personal Computer, or the internal battery of a mobile phone. For the further description of this figure it shall be assumed that the second device is a mobile phone, and the first device is a wireless headset.

In the first alternative path, step 206, a wireless configuration is sent to the first device. Steps 208 and 210 represent another alternative path here, for a detailed description it is referred to steps 108 and 110 of FIG. 1, which are similar.

In step 212 the wireless interface of the second device is configured according to the obtained configuration. However, in contrast to the method of FIG. 1 this step is optional for this embodiment. Particularly when only pushing configuration data to the first device and having a fixed network setup in the second device, this step may be omitted.

Steps 214, 216 and 218 are performed similar to step 114, 116 and 118. For a detailed description it is therefore referred to the relevant passages of FIG. 1.

Figure 3:
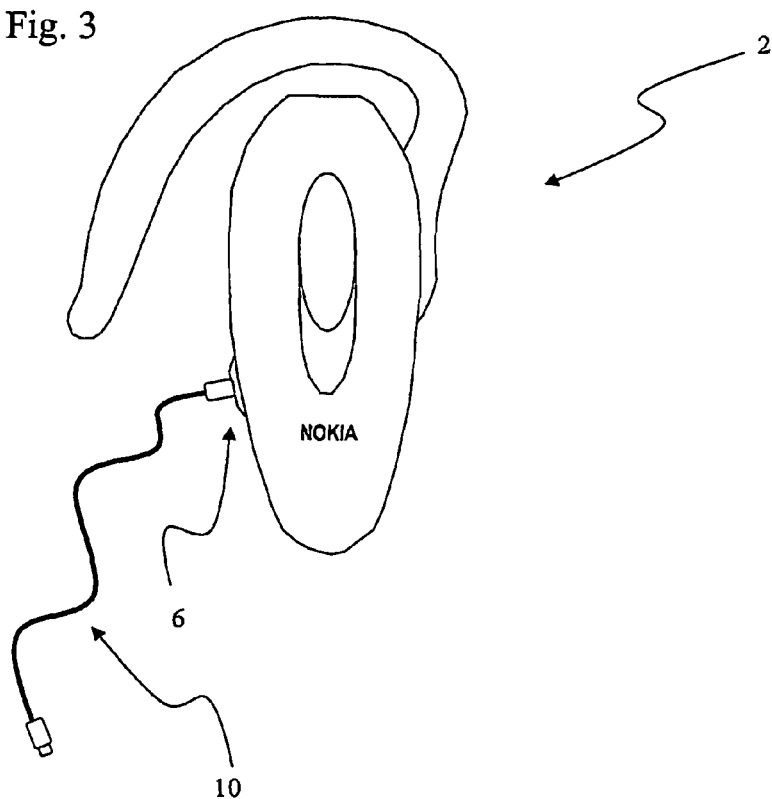
FIG. 3 shows a 2-D view of an embodiment according to the present invention.

FIG. 3 is a 2-D view of a wireless headset 2 according to an embodiment of the invention. It is to be noted that the present invention can be applied to all kinds of wireless devices. However, wireless headsets are good examples for such devices; therefore the following description will be focused thereon.

The headset 2 comprises a USB interface 6. Using a USB cable, e.g. having a micro-USB plug, the headset can be connected with a mobile phone or other wireless device. The USB interface 6 can be implemented just as a USB socket, but it may also be implemented with a fixed USB cable, depending on the desired size and weight.

Figure 4:
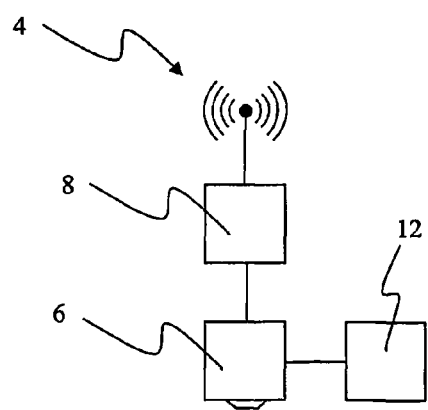
FIG. 4 shows a schematic view of internal components of the headset of FIG. 3.

The internal components of the headset are shown in FIG. 4. The USB interface 6 is also shown here. It is connected with a controller 8, which in turn is connected with a wireless interface 4. The wireless interface 4 can be any kind of wireless interface, e.g. a Bluetooth or WLAN transceiver. The controller 8 is adapted to perform a method as described in conjunction with FIG. 1.

Figure 5:
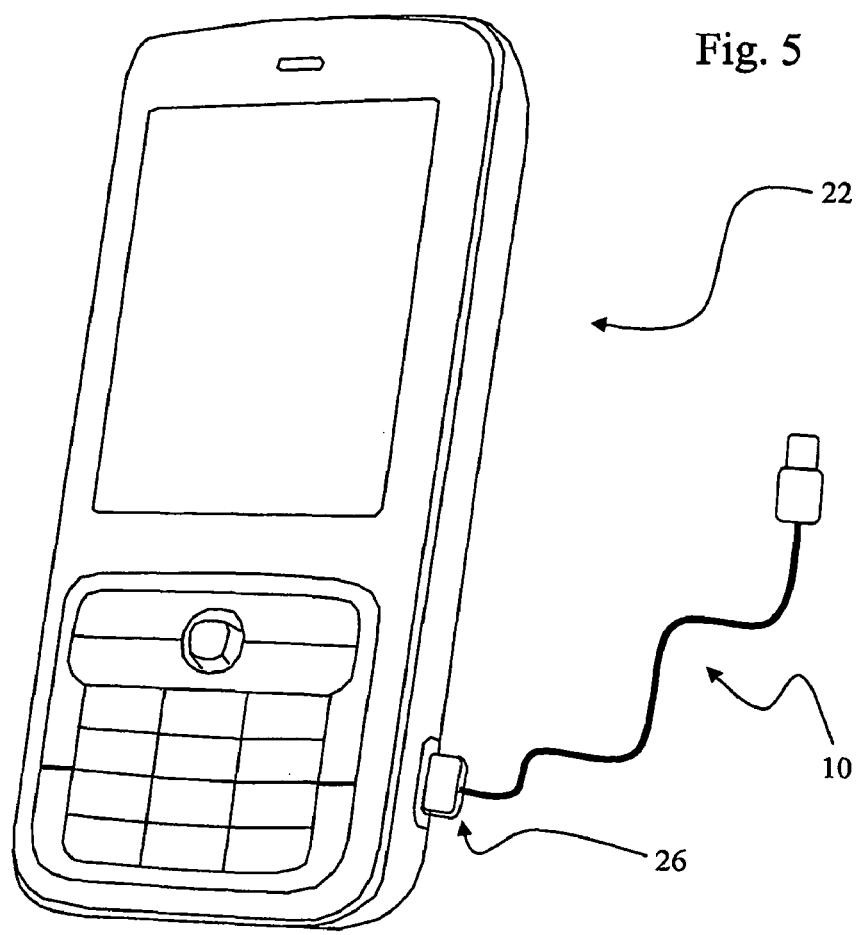
FIG. 5 shows a 3-D view of an embodiment according to the present invention.

FIG. 5 is a 3-D view of a mobile phone 22 according to an embodiment of the present invention. It comprises a USB interface 26. Using a USB cable 10, e.g. having a micro-USB plug, the mobile phone can be connected with a headset as in FIG. 3 or other wireless peripheral device.

Figure 6:
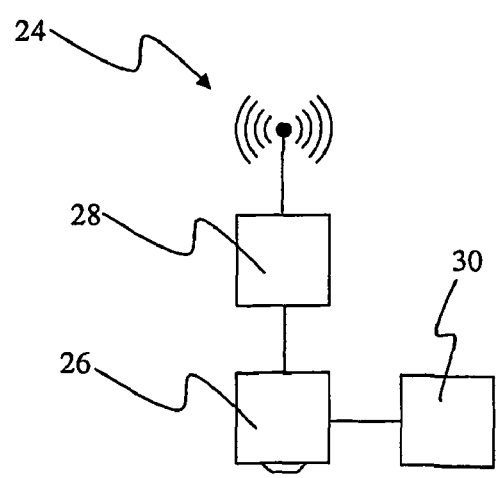
FIG. 6 shows a schematic view of internal components of the mobile phone of FIG. 5.

The internal components of the mobile phone 22 are shown in FIG. 6. The USB interface 26 is also shown here. It is connected with a controller 28, which in turn is connected with a wireless interface 24. The wireless interface 24 can be any kind of wireless interface, e.g. a Bluetooth or WLAN transceiver. The controller 28 is adapted to perform a method as described in conjunction with FIG. 2.

One main aspect of the invention is to use the USB connection to make e.g. a wireless headset usable even in case its battery is discharged. According to the invention the battery will then be charged from the mobile phone (or PDA, music player etc.), and the usage for the user is the same as if he/she was using a wired headset.

An audio connection can then either be routed through the wired USB connection (which requires USB functionality to be present on both sides) or still over the wireless link, e.g. Bluetooth.

The invention can, in an exemplary embodiment, also be implemented as follows. The wireless headset, when connected to the mobile phone, presents itself on the USB interface as a wired USB headset and will behave as such. Part of the current drawn from the host (mobile phone) is used to charge the batteries of the device (headset).

According to another main aspect of the present invention, also authentication and/or configuration of the device for wireless usage is performed via USB. Or more generally speaking, a suitable network configuration can be performed via USB, enabling to connect two devices wirelessly.

Such an "out of band"-authentication (OOB) would spare the user the cumbersome procedure of searching for devices (Bluetooth discovery), entering a PIN and accepting a connection, as is the case with conventional Bluetooth devices (pairing procedure). The devices could furthermore exchange e.g. much longer PINs (and thus improve security) than a typical user would use, like a PIN which is short and simple ("1234", "0000" or the like).

While specifically useful in conjunction with a Bluetooth pairing procedure, the invention can also be used for other wireless interfaces, such as WLAN. In one embodiment very basic parameters like the settings for IP address, gateway address, DNS server address and the like can be negotiated or submitted. However, also WLAN usually provides means for improving the link security, like the WEP (Wireless Equivalency Protocol) or the current WPA (Wireless Protected Access) schemes. These protocols also require exchanging certain information such as keys.

Using the present invention such keys and other security related parameters can easily be exchanged between wireless devices, without user interaction. Due to the fact that this exchange is performed via the wired USB connection, security is maintained, that is, eavesdropping on an unsecured wireless transmission of keys can be avoided.

The present invention facilitates pairing, network set-up and connection management of wireless links and networks (OOB=Out-Of-Band method) by using a USB connection. It also enables combining pairing and connection management with charging rechargeable power supplies of mobile devices (using the same cable).

With the present invention, Bluetooth headsets or generally all mobile wireless devices can be used as easy and intuitive as wire-based peripheral devices. In other words, due to the capability of negotiating the wireless interface configuration according to the invention, it is only required to plug a peripheral device into a mobile phone or similar device. No complicated setup is required to get the device working.

In case that the devices store the configuration in memory, the setup procedure is only needed once. In Bluetooth, e.g. a list of "trusted devices" is stored for which the configurations are stored. The devices are recognized by a unique identification number, e.g. the Bluetooth-ID.

By the more advanced embodiments of the invention also an uninterruptible operation of wireless headsets and the like is enabled. By combining the provision of electrical power via a wired USB connection with the automatic (re-) routing of audio or other data traffic an error-resilient operation is ensured. According to an exemplary embodiment of the invention the audio data traffic can, upon establishment of the USB connection, be (re-) routed through the wire connection, or it may be continued via an existing wireless link.

In case the audio data traffic is routed through the USB connection, upon disconnecting the USB connection the inventive devices can re-route the traffic through an existing wireless link, or establish such a link using the negotiated configuration. As long as the USB connection is used for the data link, the wireless transceivers could thus be shut off, in order to save power and/or speed up the recharging of the mobile device's battery.

To put it simple, according to the present invention, a wireless headset can be used just like a wired headset. However, the user can (provided the battery of the headset is charged) also remove the cable. Also the other direction is possible, that is, plugging in the wireless headset via USB, in order to change the data link from wireless to wire-based. In combination with shutting down the wireless transceiver this would allow an easy possibility of using the headset even in areas where the use of wireless devices is forbidden, e.g. in airplanes. Or it would allow the user to easily react to situations in which the wireless link is disturbed by interferences.

The invention claimed is:

1. A method, comprising:
    configuring a wireless interface of a first device by:
        establishing a wired connection with a second device having a wireless interface;
        negotiating, via said wired connection, a configuration for said wireless interface with said second device, said configuration enabling a wireless connection between said first and said second device;

configuring said wireless interface of said first device according to said configuration;

routing data traffic between said first and said second device through said wired connection;

establishing a wireless connection with said second device according to said configuration, if no wireless connection exists; and routing, responsive to disconnection of said wired connection, said data traffic between said first and said second device through said established or an existing wireless connection.

2. The method according to claim 1, further comprising routing, responsive to re-connection of said wired connection, said data traffic between said first and said second device through said wired connection.

3. The method according to claim 1, wherein said negotiating comprises at least one of:

receiving said configuration;

exchanging information between said first and said second device and determining said configuration based on said information; and sending said configuration.

4. The method according to claim 1, wherein said first device comprises a rechargeable power supply, the method further comprising receiving power from said second device via said wired connection for operating said first device and/or for charging said rechargeable power supply.

5. The method according to claim 1, wherein said first device comprises a rechargeable power supply, the method further comprising providing power to said first device via said wired connection, for operating said first device and/or charging said rechargeable power supply.

6. The method according to claim 1, wherein said wired interface comprises a universal serial bus interface.

7. A computer-readable medium comprising instruction stored thereon which, when executed by a computer, perform a method comprising:

configuring a wireless interface of a first device by establishing a wired connection with a second device having a wireless interface;

negotiating, via said wired connection, a configuration for said wireless interface with said second device, said configuration enabling a wireless connection between said first and said second device;

configuring said wireless interface of said first device according to said configuration;

routing data traffic between said first and said second device through said wired connection;

establishing a wireless connection with said second device according to said configuration, if no wireless connection exists; and routing, responsive to disconnection of said wired connection, said data traffic between said first and said second device through said established or an existing wireless connection.

8. An apparatus, comprising:

a wireless interface;

a wired interface; and a controller configured to establish a wired connection with a second device having a wireless interface, configured to negotiate, via said wired connection, a configuration for said wireless interface with said second device, configure said wireless interface according to said configuration, responsive to disconnection of said wired connection configured to establish a wireless connection with said second device according to said configuration, if no wireless connection exists, and configured to route said data traffic between said apparatus and said second device through said established or an existing wireless connection, and responsive to re-connection of said wired connection configured to route said data traffic between said apparatus and said second device through said wired connection.

9. The apparatus according to claim 8, wherein said negotiating comprises at least one of:

receiving said configuration;

exchanging information with said second device and determining said configuration based on said information; and sending said configuration.

10. The apparatus according to claim 8, wherein said wireless interface is selected from the group comprising:

a Bluetooth transceiver; and a WLAN transceiver.

11. The apparatus according to claim 8, further comprising a rechargeable power supply connected with said wired interface, and wherein said wired interface is configured to receive power from said second device to operate said apparatus and/or charge said rechargeable power supply.

12. The apparatus according to claim 8, further comprising a power supply connected with said wired interface, and wherein said wired interface is configured to provide power from said power supply to said apparatus to operate said apparatus and charge said rechargeable power supply.

13. The apparatus according to claim 12, wherein said power supply connected with said wired interface is fed by a battery.

14. The apparatus according to claim 8, wherein said wired interface comprises a universal serial bus interface.

15. An apparatus, comprising:

means for establishing a wired connection with a second device having a wireless interface;

means for negotiating, via said wired connection, a configuration for a wireless interface of said apparatus with said second device, said configuration enabling a wireless connection between said apparatus and said second device;

means for configuring said wireless interface of said apparatus according to said configuration;

means for routing data traffic between said apparatus and said second device through said wired connection;

means for establishing a wireless connection with said second device according to said configuration, if no wireless connection exists; and means for routing, responsive to disconnection of said wired connection, said data traffic between said apparatus and said second device through said established or an existing wireless connection.

16. The apparatus according to claim 15, further comprising means for routing, responsive to re-connection of said wired connection, said data traffic between said apparatus and said second device through said wired connection.

* * * * *